(12) United States Patent
Park et al.

(10) Patent No.: US 7,759,153 B2
(45) Date of Patent: Jul. 20, 2010

(54) METHOD OF FABRICATING ELECTRIC FIELD SENSOR HAVING ELECTRIC FIELD SHIELD

(75) Inventors: Chul-min Park, Yongin-si (KR); Hyoung-soo Ko, Seoul (KR); Seung-bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 11/872,065

(22) Filed: Oct. 15, 2007

(65) Prior Publication Data

US 2008/0138924 A1 Jun. 12, 2008

(30) Foreign Application Priority Data

Dec. 12, 2006 (KR) .................. 10-2006-0126407

(51) Int. Cl.
*H01L 21/00* (2006.01)
*H01L 21/84* (2006.01)
*H01L 21/331* (2006.01)
*H01L 21/8222* (2006.01)

(52) U.S. Cl. .................. 438/52; 438/164; 438/319; 438/343

(58) Field of Classification Search .................. 438/52, 438/38, 41, 164, 319, 343, 412, 294, 50, 438/54, 378, 512, 514, 308, 510, 515, 517, 438/526, 59

See application file for complete search history.

(56) References Cited

U.S. PATENT DOCUMENTS

| 5,838,005 A | * | 11/1998 | Majumdar et al. | ............. 850/9 |
| 2006/0157440 A1 | * | 7/2006 | Jung et al. | ..................... 216/2 |

FOREIGN PATENT DOCUMENTS

WO     03/096409 A1     11/2003

* cited by examiner

*Primary Examiner*—Chuong A. Luu
(74) *Attorney, Agent, or Firm*—Sughrue Mion, PLLC

(57) ABSTRACT

A method of manufacturing an electric field sensor having an electric field shield. The method includes providing a substrate doped with a first impurity; forming a resistive tip having a resistance region doped with a low concentration of a second impurity at an apex of a protruding portion of the substrate, and first and second semiconductor electrode regions doped with a high concentration of the second impurity on both slopes of the protruding portion with the resistive region therebetween, wherein the second impurity has a polarity opposite to that of the first impurity; forming a dielectric layer on the resistive tip; forming a mask having a high aspect ratio on the dielectric layer; depositing a metal layer on the dielectric layer; and exposing the dielectric layer formed on the resistance region through the metal layer by removing the mask.

9 Claims, 7 Drawing Sheets

METHOD OF FABRICATING ELECTRIC FIELD SENSOR HAVING ELECTRIC FIELD SHIELD

CROSS-REFERENCE TO RELATED PATENT APPLICATIONS

This application claims priority from Korean Patent Application No. 10-2006-0126407, filed on Dec. 12, 2006, in the Korean Intellectual Property Office, the disclosure of which is incorporated herein in its entirety by reference.

BACKGROUND OF THE INVENTION

1. Field of the Invention

Methods consistent with the present invention relate to a method of fabricating a high resolution electric field sensor having an electric field shield.

2. Description of the Related Art

In order to increase the information storing capacity, a probe should detect surface charges present in a small region of a few tens of nanometers in an information storage medium. Such probe can be applied to a scanning probe microscopy and a hard drive.

FIG. 1 is a cross-sectional view of a cantilever 70 having a related art resistive tip 50 as disclosed in International Patent Publication WO 03/096409. A resistive tip 50 is formed vertically on the cantilever 70. The resistive tip 50 may have a diameter of a few tens of nanometers and a number of cantilevers 70 may be arranged in array.

Referring to FIG. 1, the resistive tip 50 includes a main body 58 doped with a first impurity. A resistance region 56 is located on an apex portion of the resistive tip 50 and is doped with a low concentration of a second impurity, and first and second semiconductor electrode regions 52 and 54 which are located on both side slopes of the main body 58 and are doped with a high concentration of the second impurity.

However, in the semiconductor probe having the related art resistive tip 50, the regions of the slopes of the first and second semiconductor electrode regions 52 and 54 doped with a high concentration are reduced by excessive etching during a wet etching process for forming the resistive tip 50. Accordingly, the first and second semiconductor electrode regions 52 and 54 may have the characteristic of the resistance region 56 due to the reduction of the conductive regions on the slopes. Therefore, the spatial resolution to resistance variation can be reduced.

Meanwhile, to increase the spatial resolution of the semiconductor probe, research on a semiconductor probe having an electric field shield on the slope of a resistive tip has been conducted to prevent the first and second semiconductor electrode regions 52 and 54 from having the characteristics of the resistance region 56. However, it is difficult to align an opening of the electric field shield on the tip of the semiconductor probe in a process of manufacturing the semiconductor probe having the electric field shield. Also, it is difficult to form a diameter of the opening of the electric field shield to have a constant size.

SUMMARY OF THE INVENTION

Exemplary embodiments of the present invention provide a method of manufacturing an electric field sensor that has high spatial resolution and an electric field shield including an opening that is aligned on a resistive tip and has a uniform diameter.

According to an aspect of the present invention, there is provided a method of manufacturing an electric field sensor having an electric field shield, comprising: providing a substrate doped with a first impurity; forming a resistive tip having a resistance region doped with a low concentration of a second impurity at an apex of a protruding portion of the substrate, and first and second semiconductor electrode regions doped with a high concentration of the second impurity on both slopes of the protruding portion with the resistive region therebetween, wherein the second impurity has a polarity opposite to that of the first impurity; forming a dielectric layer on the resistive tip; forming a mask having a high aspect ratio on the dielectric layer; depositing a metal layer on the dielectric layer; and exposing the dielectric layer formed on the resistance region through the metal layer by removing the mask.

The mask may have an aspect ratio of at least 3:1.

The forming of the mask may comprise depositing the mask using a focused ion beam (FIB) system.

The mask may have an upper diameter greater than a lower diameter thereof that contacts the dielectric layer on the resistance region.

The forming of the mask may comprise forming the lower diameter of the mask that contacts the dielectric layer to 10 to 100 nm.

The mask may be formed of a material selected from the group consisting of carbon, tungsten, platinum, silicon oxide, and silicon nitride.

The method may further comprise exposing the resistance region by etching the dielectric layer on the resistance region exposed through the metal layer.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF EXEMPLARY EMBODIMENTS OF THE INVENTION

Figure 1:
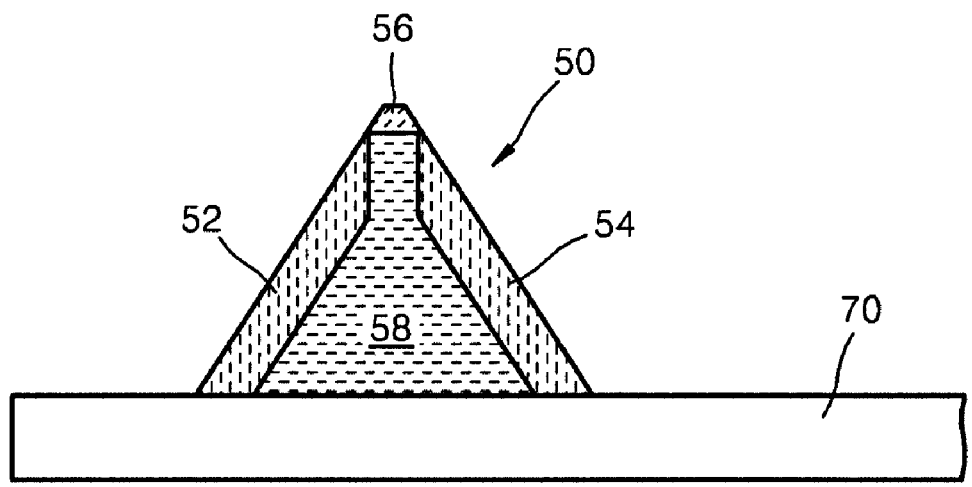
FIG. 1 is a cross-sectional view of a cantilever having a related art resistive tip.

A method of manufacturing a high resolution electric field sensor having an electric field shield consistent with the present invention will now be described more fully with reference to the accompanying drawings in which exemplary embodiments of the invention are shown. In the drawings, the thicknesses of layers and regions are exaggerated for clarity.

Figure 2:
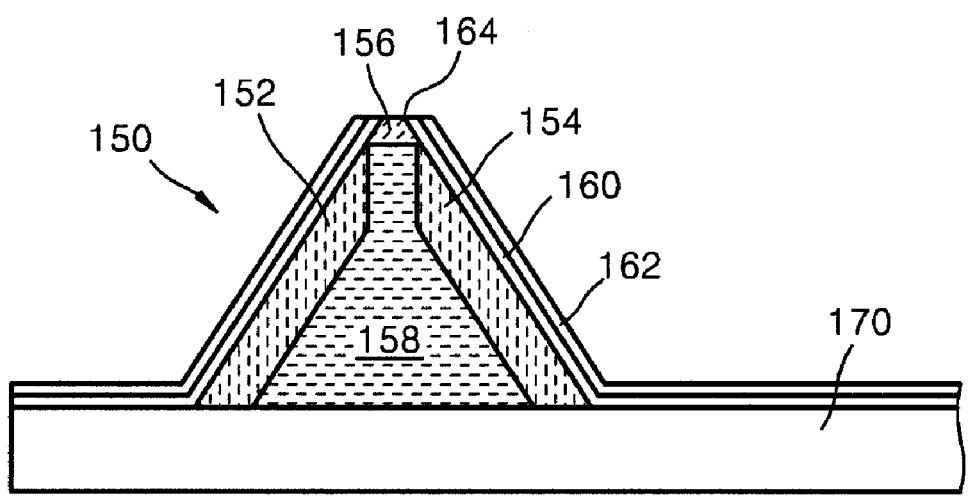
FIG. 2 is a cross-sectional view illustrating a tip portion of an electric field sensor manufactured according to an exemplary embodiment of the present invention.

FIG. 2 is a cross-sectional view illustrating a tip portion of an electric field sensor manufactured according to an exemplary embodiment of the present invention.

Referring to FIG. 2, a resistive tip 150 of an electric field sensor is vertically formed on a substrate 170. The resistive tip 150 includes a main body 158 doped with a first impurity, a resistance region 156 located on an apex portion of the resistive tip 150 and doped with a low concentration of a second impurity, and first and second semiconductor electrode regions 152 and 154 which are located on both side slopes of the main body 158 and are doped with a high concentration of the second impurity. The first impurity may be a p type impurity, and the second impurity may be an n type impurity. A dielectric layer 160 and an electric field shield 162 are respectively formed on the first and second semiconductor electrode regions 152 and 154.

The dielectric layer 160 may be formed of Si3N4 or SiO2. The electric field shield 162 may be formed of, for example, Al, Au, or Pt. An opening 164 of the electric field shield 162 is formed to have a diameter of 100 nm or less, preferably, but not necessarily, a few tens of nm or less.

The electric field shield 162 prevents regions, that is, the first and second semiconductor electrode regions 152 and 154 besides the resistance region 156, from being affected by an electric field generated due to surface charge of an information storage medium. The electric field generated by the surface charge causes a resistance difference of the resistance region 156. Therefore, from the change in resistance of the resistance region 156, the polarity and amount of the surface charge can be precisely measured.

In particular, in the resistive tip 150 according to the present exemplary embodiment, an entire region except the resistance region 156 is covered by the electric field shield 162. Accordingly, the spatial resolution of the resistive tip 150 is increased.

FIGS. 3A through 3K are perspective views and cross-sectional views sequentially illustrating a method of manufacturing a high resolution electric field sensor having an electric field shield according to an exemplary embodiment of the present invention.

Figure 3A:
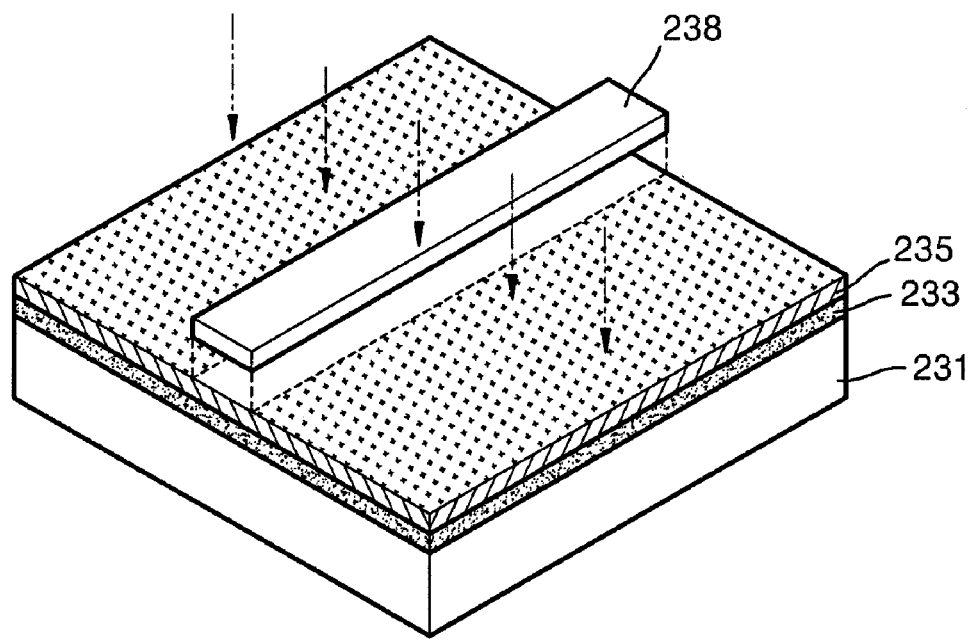
FIGS. 3A through 3K are perspective views and cross-sectional views sequentially illustrating a method of manufacturing a high resolution electric field sensor having an electric field shield according to an exemplary embodiment of the present invention.

Referring to FIG. 3A, a mask film 233 is formed using silicon oxide or silicon nitride on a surface of a silicon substrate 231 doped with a first impurity. A silicon on insulator (SOI) substrate may be used as the substrate 231. After coating a photoresist 235 on the mask film 233, a stripe-shaped mask 238 is placed above the photoresist 235.

Figure 3B:
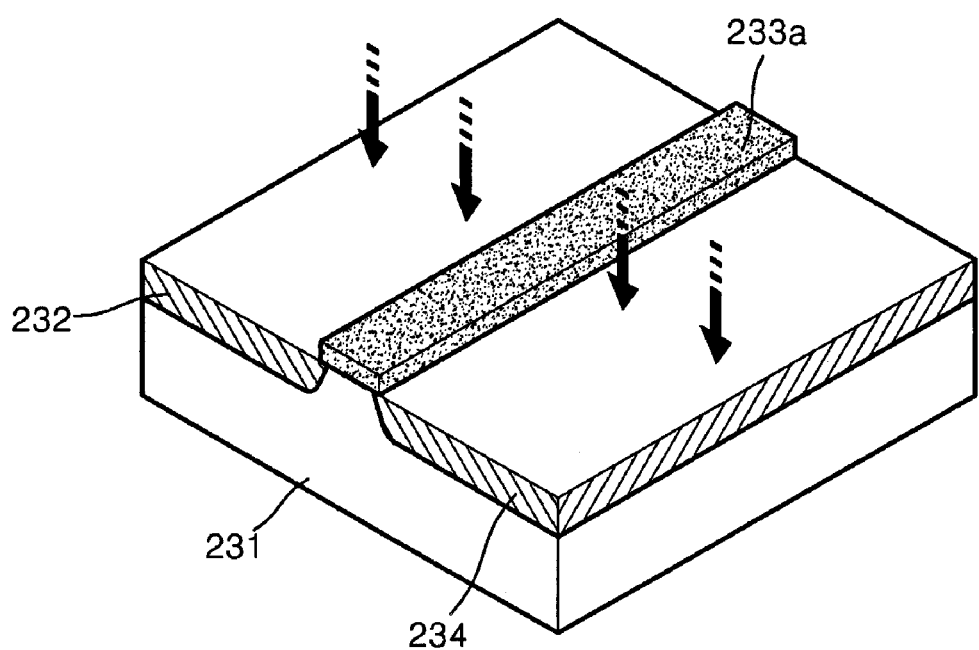

Referring to FIG. 3B, a stripe-shaped first mask 233a is formed on the substrate 231 by performing exposure, developing, and etching processes. Next, first and second semiconductor electrode regions 232 and 234 are formed by doping a second impurity with a high concentration on regions except for the mask film 233a. The first and second semiconductor electrode regions 232 and 234 act as conductors since the first and second semiconductor electrode regions 232 and 234 have very low resistances.

Figure 3C:
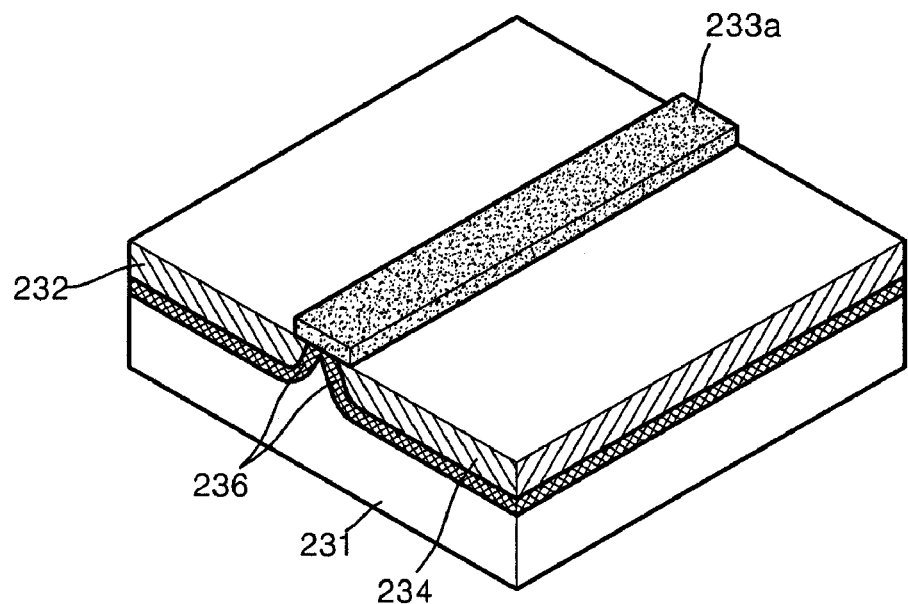

Referring to FIG. 3C, a width between the first and second semiconductor electrode regions 232 and 234 is formed smaller than the width of the mask film 233a by annealing the substrate 231. When the high concentration regions 232 and 234 of the second impurity are increased, resistance regions 236, which are low concentration regions doped with the second impurity, are formed since the second impurity is diffused into the regions adjacent to the high concentration region. The resistance regions 236 below the mask film 233a contact each other to form an apex forming portion of a resistive tip, which will be described later. The contact of the resistance regions 236 to form the apex portion may be achieved in an annealing process, which will be described later.

Figure 3D:
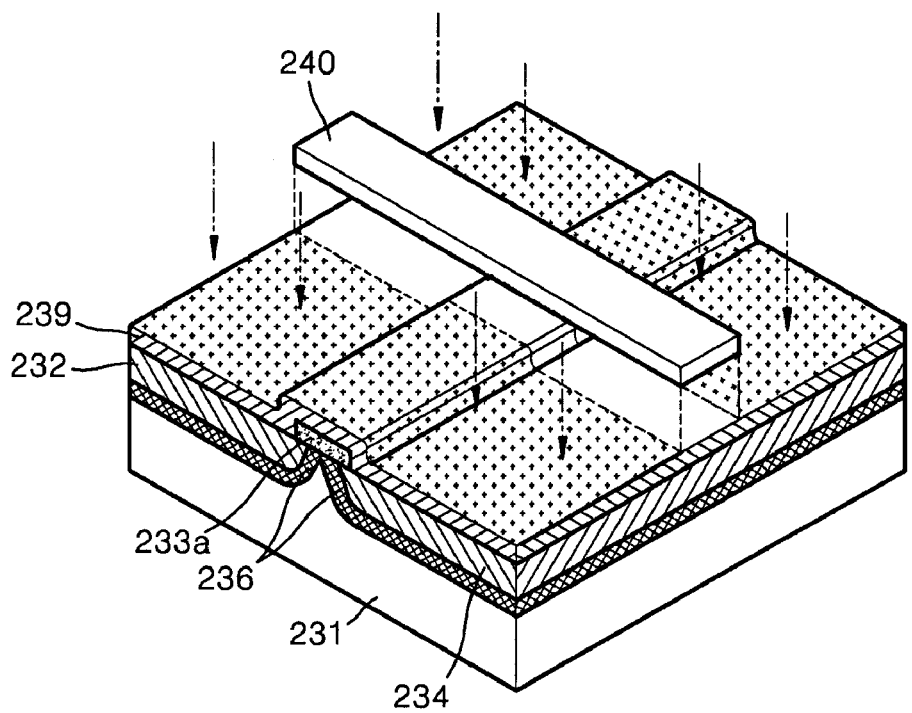
Figure 3E:
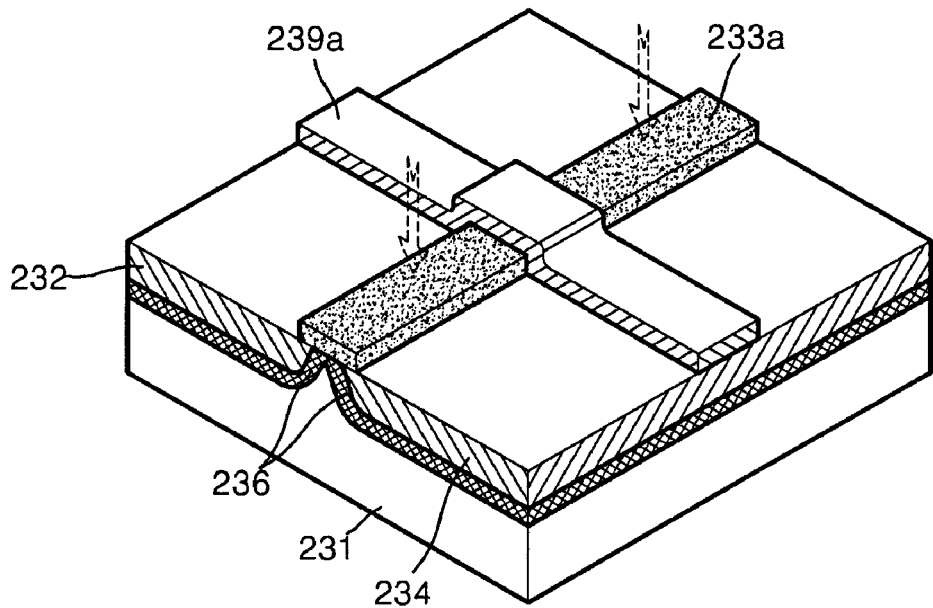

Referring to FIGS. 3D and 3E, after coating a photoresist layer 239 on an upper surface of the substrate 231 to cover the mask film 233a, a stripe-shaped photomask 240 is placed perpendicularly to the mask film 233a above the photoresist layer 239. Next, a photoresist layer 239a having an identical shape to the photomask 240 is formed by performing exposure, developing, and etching processes.

Figure 3F:
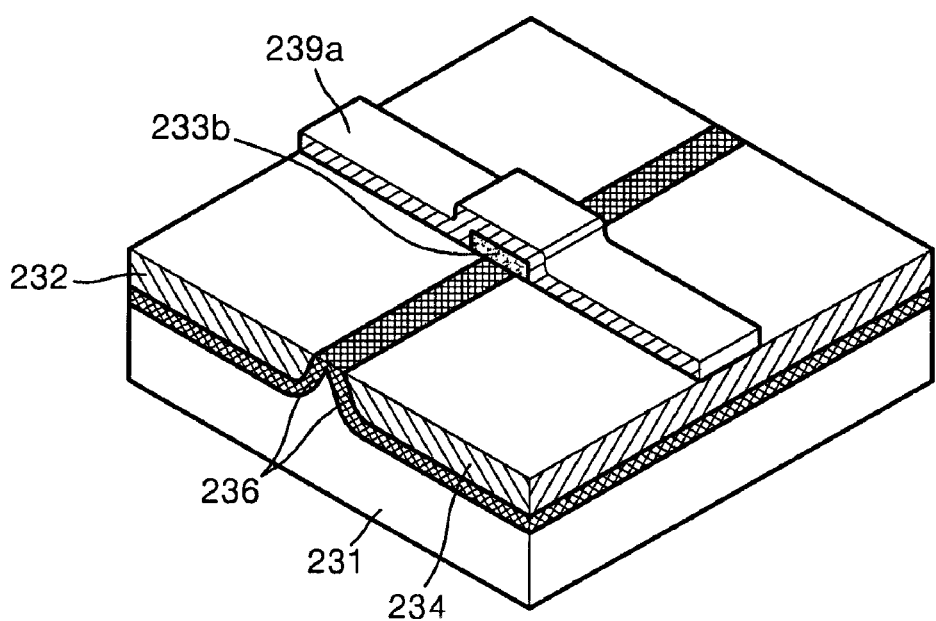

Referring to FIG. 3F, a rectangular mask film 233b is formed by dry etching the mask film 233a that is not covered by the stripe-shaped photoresist layer 239a.

Figure 3G:
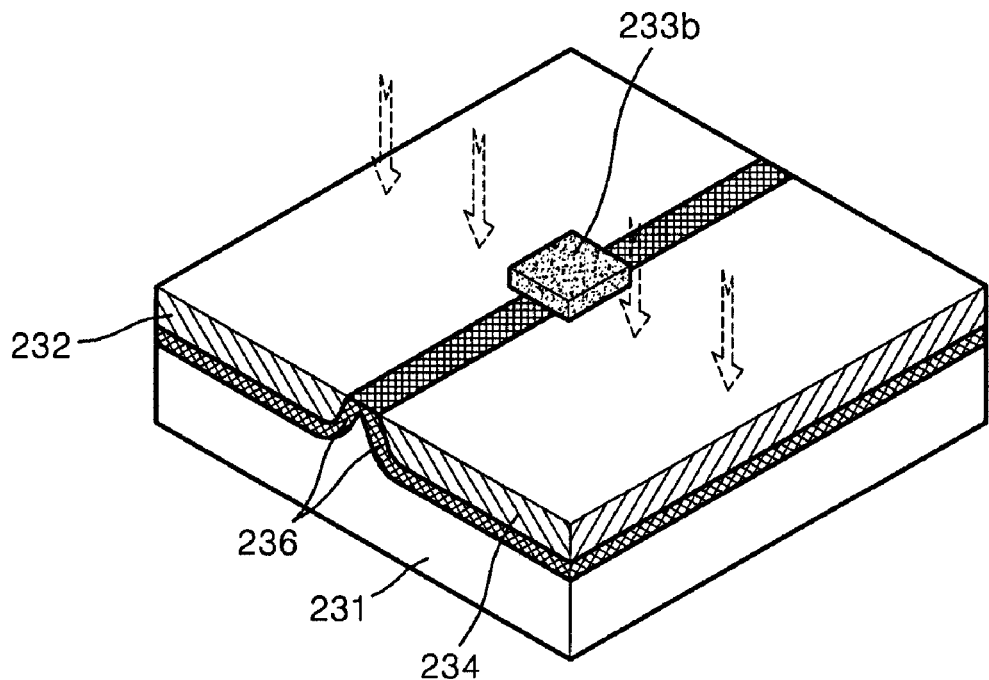

Referring to FIG. 3G, which shows a portion of the substrate 231 around the tip, after removing the photoresist layer 239a, the substrate 231 is dry or wet etched using the rectangular mask film 233b as a mask.

Figure 3H:
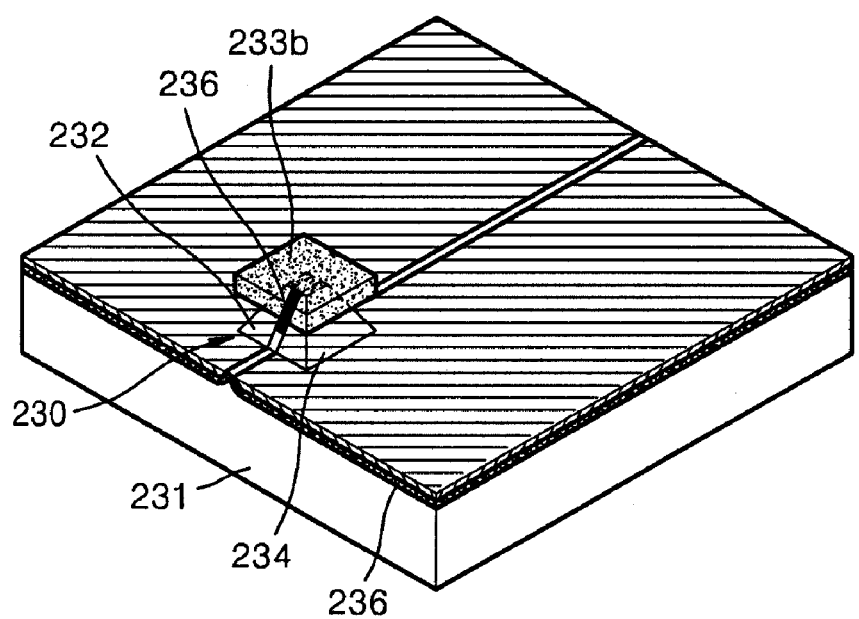

Referring to FIG. 3H, which shows a larger portion of the substrate 231, where the tip is located on an end portion of the substrate 231, first and second semiconductor electrode regions 232 and 234 of a resistive tip 230 are formed and the resistance region 236 is aligned between the first and second semiconductor electrode regions 232 and 234.

Next, after removing the mask film 233b, the substrate 231 is annealed under an oxygen atmosphere. As a result, silicon oxide film (not shown) having a predetermined thickness is formed on the upper surface of the substrate 231. When the silicon oxide film is removed, the resistance region 236 has a sharp end. When the annealing process is performed, both the sharpening of the resistive tip 230 and the contact of the separated resistance regions 236 may be achieved.

Figure 3I:
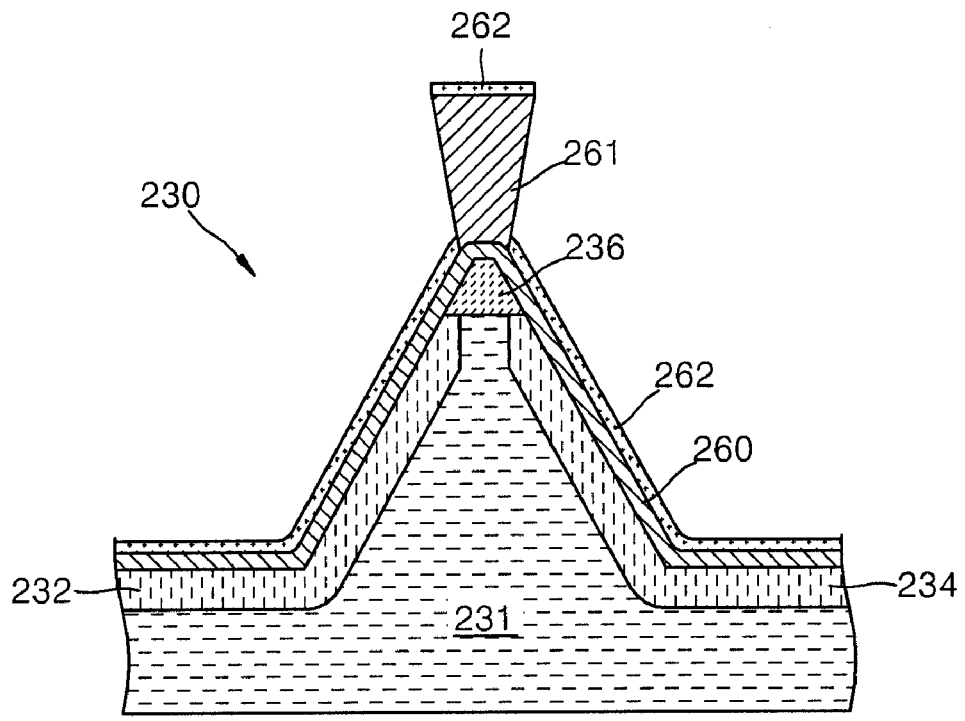

Referring to FIG. 3I, a dielectric layer 260 covering the resistive tip 230 is formed on the substrate 231. The dielectric layer 260 may be formed by depositing Si3N4 or may be a SiO2 film formed on the resistive tip 230 by annealing the substrate 231 to a thickness of 10 to 100 nm.

Next, a mask 261 having a diameter of approximately a few tens of nm is formed on the dielectric layer 260 above a resistance region 236. The mask 261 is formed to have a high aspect ratio of at least 3:1. The mask 261 may be deposited and aligned on an upper part of the resistance region 236 using a focused ion beam (FIB) system. In particular, the mask 261 may have an upper diameter greater than a lower diameter that contacts the dielectric layer 260. The mask 261 may be formed of a material selected from carbon, tungsten, platinum, silicon oxide, and silicon nitride.

Next, a metal layer 262 is formed on the dielectric layer 260 to a thickness of 10 to 100 nm using a metal, for example, Al, Au, Pt by depositing or sputtering.

Figure 3J:
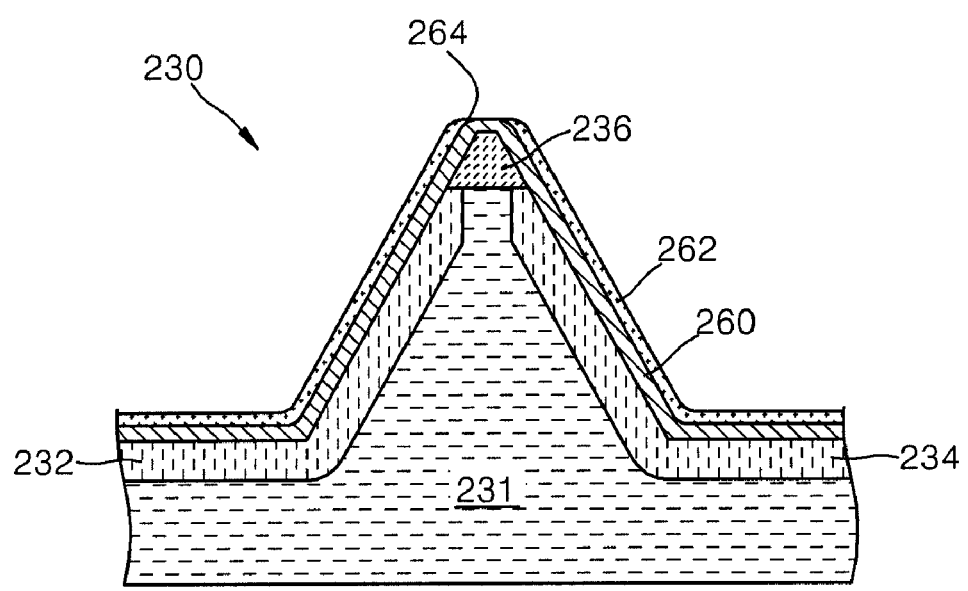

Referring to FIG. 3J, an opening 264 is formed in the metal layer 262 by lifting-off the mask 261. The opening 264 is aligned with an upper part of the resistance region 236, and has a diameter equal to the lower diameter of the mask 261.

Figure 3K:
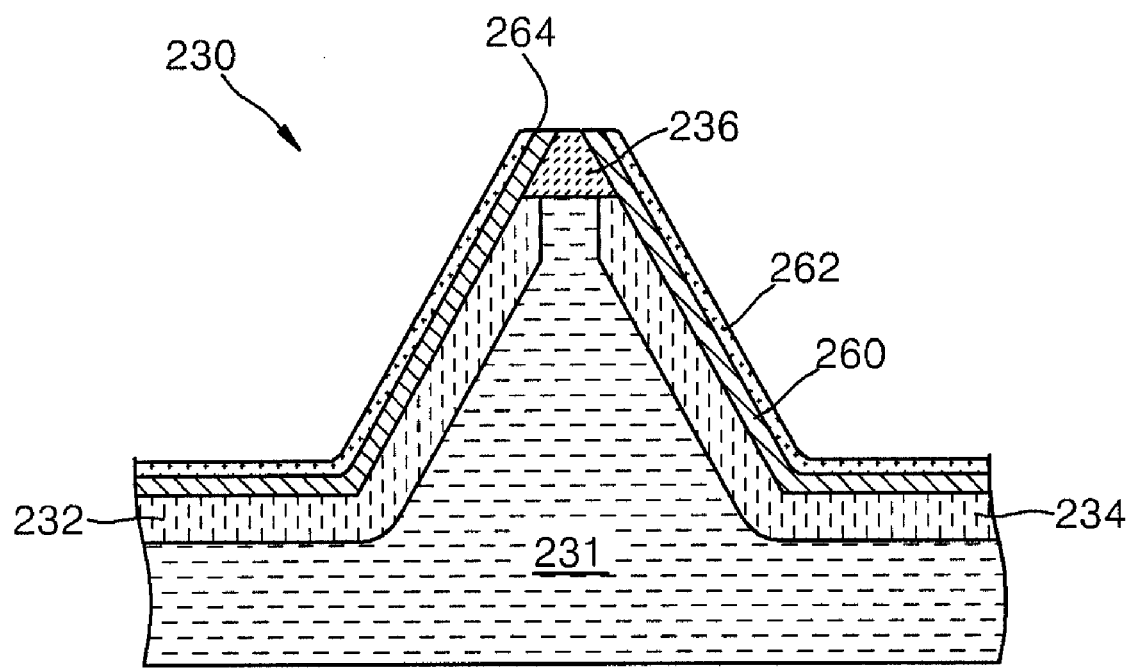

Referring to FIG. 3K, the dielectric layer 260 exposed through the opening 264 is etched using the metal layer 262 in which the opening 264 is formed. As a result, the resistance region 236 is exposed, and the metal layer 262 becomes an electric field shield 262 that exposes the resistance region 236. The dielectric layer 260 exposed by the opening 264 may not be etched, or the thickness of the dielectric layer 260 in which the opening 264 is formed may be reduced by controlling the etching time.

Consistent with the present invention, an opening of an electric field shield may be readily aligned on a resistance region. Also, the diameter of the opening of the electric field shield may be formed to be constant by controlling a lower diameter of a mask.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing an electric field sensor having an electric field shield, comprising:

provinding a substrate doped with a first impurity;

forming a resistive tip having a resistance region doped with a low concentration of a second impurity at an apex of a protruding portion of the substrate, and first and second semiconductor electrode regions doped with a high concentration of the second impurity on both slopes of the protruding portion with the resistive region therebetween, wherein the second impurity has a polarity opposite to that of the first impurity;

forming a dielectric layer on the resistive tip;

forming a mask having a high aspect ratio on the dielectric layer;

depositing a metal layer on the dielectric layer; and exposing the dielectric layer formed on the resistance region through the metal layer by removing the mask.

2. The method of claim 1, wherein the mask has an aspect ratio of at least 3:1.

3. The method of claim 1, wherein the forming of the mask comprises depositing the mask using a focused ion beam (FIB) system.

4. The method of claim 1, wherein the mask has an upper diameter greater than a lower diameter thereof that contacts the dielectric layer on the resistance region.

5. The method of claim 1, wherein the forming of the mask comprises forming the lower diameter of the mask that contacts the dielectric layer to 10 to 100 nm.

6. The method of claim 1, wherein the mask is formed of a material selected from carbon, tungsten, platinum, silicon oxide, and silicon nitride.

7. The method of claim 1, further comprising exposing the resistance region by etching the dielectric layer on the resistance region exposed through the metal layer.

8. The method of claim 1, wherein the forming of the dielectric layer comprises depositing the dielectric layer having a first thickness on the resistance region.

9. The method of claim 1, wherein the mask is formed to correspond to the resistance region.

* * * * *